(12) United States Patent
Mikan et al.

(10) Patent No.: US 7,047,048 B2
(45) Date of Patent: May 16, 2006

(54) SYSTEM AND METHOD FOR REMOTE DIALABLE NUMBER CONVERSION

(75) Inventors: Jeffrey Clinton Mikan, Cumming, GA (US); George Samuel Creigh, Acworth, GA (US); Kenneth D. Heil, Marietta, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 431 days.

(21) Appl. No.: 10/316,627

(22) Filed: Dec. 11, 2002

(65) Prior Publication Data

US 2004/0203954 A1  Oct. 14, 2004

(51) Int. Cl.
*H04Q 7/20* (2006.01)
(52) U.S. Cl. .................... 455/564; 455/550.1
(58) Field of Classification Search ........... 455/564, 455/566, 550.1, 414.4, 186.1; 379/900, 289, 379/221.4, 265.02; 709/328; 370/352, 353; 395/768; 715/507
See application file for complete search history.

(56) References Cited

U.S. PATENT DOCUMENTS

| 5,983,095 | A * | 11/1999 | Cameron ................ 455/417 |
| 6,631,278 | B1 * | 10/2003 | Abrol et al. ............. 455/564 |
| 6,697,484 | B1 * | 2/2004 | Fleming, III ............ 379/354 |
| 6,731,625 | B1 * | 5/2004 | Eastep et al. ............ 370/352 |
| 2002/0112046 | A1 * | 8/2002 | Kushwaha et al. ...... 709/223 |
| 2004/0018852 | A1 * | 1/2004 | Burke et al. ............ 455/550.1 |
| 2005/0084079 | A1 * | 4/2005 | Lang ..................... 379/88.18 |

* cited by examiner

*Primary Examiner*—Jean Gelin
(74) *Attorney, Agent, or Firm*—Moazzam & Associates, LLC

(57) ABSTRACT

A server for use in a mobile communications network to convert an input alphanumeric string into an output numeric string. The server includes an input gateway to receive the input alphanumeric string; memory; and a processor coupled to the input gateway and the memory. The processor is operable to receive the input alphanumeric string; replace one or more characters within the input alphanumeric string with its numeric equivalent to generate an output numeric string; and return the output numeric string.

12 Claims, 9 Drawing Sheets

SYSTEM AND METHOD FOR REMOTE DIALABLE NUMBER CONVERSION

RELATED APPLICATIONS

This application is related to the application entitled "System and Method for Text to Dialable Number Conversion in a Mobile Platform" by Jeffrey Mikan, George S. Creigh, & Kenneth D. Heil filed concurrently with the present application.

TECHNICAL FIELD

This invention relates to the field of mobile telecommunications, and more specifically, a system for and method of providing a text to dialable number conversion function.

BACKGROUND

The world is currently experiencing a telecommunications revolution. The days of everyone communicating solely over land lines, i.e. the public switched telephone network or PSTN, have long past. Mobile telecommunications has established itself as the future of telecommunications. With this evolution in telephony comes a need to change the way that people interact with telephonic devices.

The standard PSTN terminal, the desktop telephone with the familiar 12 key dial pad, was the paradigm for which initial mobile devices were built. Since the 1980's cellular telephones have been built around the 12 key dial pad comprising the digits 0–9 and the characters, "*" and "#". The digits on the dial pad are respectively associated with three or more alphabetic characters. For example, the number 2 is associated with the characters "A", "B", and "C". This is a useful feature for those wishing to provide a simple to remember word for their telephone number. For example, AT&T long distance uses the phone number 1-800-225-5288 which is the equivalent of 1-800-CALL-ATT.

While it is easy to remember this phrase for reaching AT&T, dialing the number required a user to pay careful attention to the small alpha characters on the keypad in order to enter the telephone number. This is enough of a challenge on a standard desktop phone, but when this must be performed on a small mobile telephone keypad, the task becomes much more difficult.

As mobile device design shifts away from the desktop paradigm, the keypad is often being replaced or augmented by other text entry methods. For example, many mobile platforms today have a full alphanumeric keypad installed or permit entry of text via pen strokes, e.g. a graffiti entry system on PalmOS mobile devices. Although these modern mobile platforms have the alternate entry means of an alphanumeric keypad or graffiti, users are still required to utilize the 12 digit keypad to painfully, manually convert text based phone numbers to numeric phone numbers.

The present invention is directed to overcoming one or more problems identified above.

SUMMARY OF THE INVENTION

In accordance with an aspect of the present invention, a server for use in a mobile communications network to convert an input alphanumeric string into an output numeric string is described. The server includes an input gateway to receive the input alphanumeric string; memory; and a processor coupled to the input gateway and the memory. The processor is operable to receive the input alphanumeric string; replace one or more characters within the input alphanumeric string with its numeric equivalent to generate an output numeric string; and return the output numeric string.

Further aspects of the present invention provide a method of converting an alphanumeric input string into a numeric input string on a server. The method comprises: receiving the input alphanumeric string from a mobile device; replacing one or more characters within the input alphanumeric string with its numeric equivalent to generate an output numeric string; and providing the output numeric string to the mobile device.

Further aspects of the present invention provide a method of converting an alphanumeric input string into a numeric input string on a server. The method comprises: receiving the input alphanumeric string from a mobile device; replacing one or more characters within the input alphanumeric string with its numeric equivalent to generate an output numeric string; and dialing a destination based on the output numeric string.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing summary and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

The text to dialable number conversion system according to embodiments of the present invention take an input string of alphanumeric characters and converts the non-numeric characters into numbers, resulting in an output string of purely dialable numbers. The conversion system may be resident on the mobile platform or located on some remote platform, for example, a network switch, message server, WAP application server, or Internet application server. Once the conversion is performed, either locally within the platform or remote, the converted numeric string is utilized to dial the telephone number of a called party.

Figure 1:
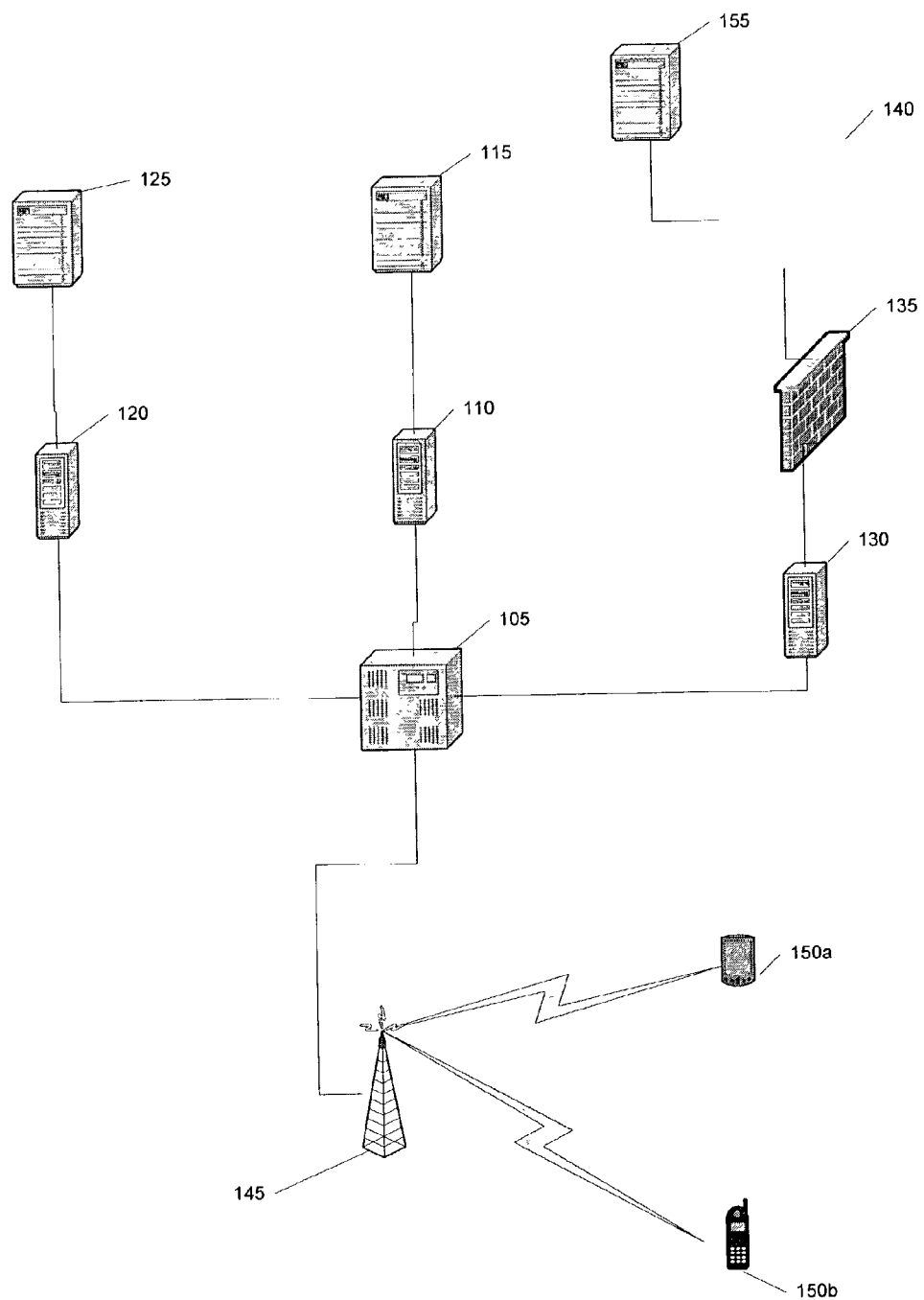
FIG. 1 illustrates a mobile telephone system in which embodiments employing the principles of the present invention may be utilized.

FIG. 1 illustrates a mobile telephone system in which embodiments employing the principles of the present invention may be utilized. A mobile platform 150 communicates via a communication tower 145 to a mobile switching system 105. The mobile platform 150 may be any wireless device that comprises a text entry method in addition to, or in place of, the traditional 12 key keypad. For example, mobile platform 150 may be, for example: a Kyocera brand PDA/Mobile phone that features graffiti or soft keyboard input; a mobile phone powered by the Windows CE operating system; or a mobile phone powered by the Symbian operating system. While the full mobile switching system 105 is not shown in detail, those skilled in the art will appreciate that the type of cellular switching system is irrelevant to the application of embodiments of the present invention. For example, the switching system 105 might operate under the GSM, CDMA, CDMA2000, or UMTS protocols.

The mobile switching system 105, in addition to being in communication with a PSTN (not shown), may be in communication with one or more of the following devices: an SMS (Short Message Service) or Mobitex Message Server 125 via Message Gateway 120; a WAP (Wireless Application Protocol) Server 115 via WAP Gateway 110; or an Internet Application Server 155 via Internet 140 and Firewall 135. The text to dialable number conversion system may operate solely in the mobile platform 150, or may be made available in one or more of the Message Server 125, the WAP Application Server 115, and/or the Internet Application Server 140.

Figure 2:
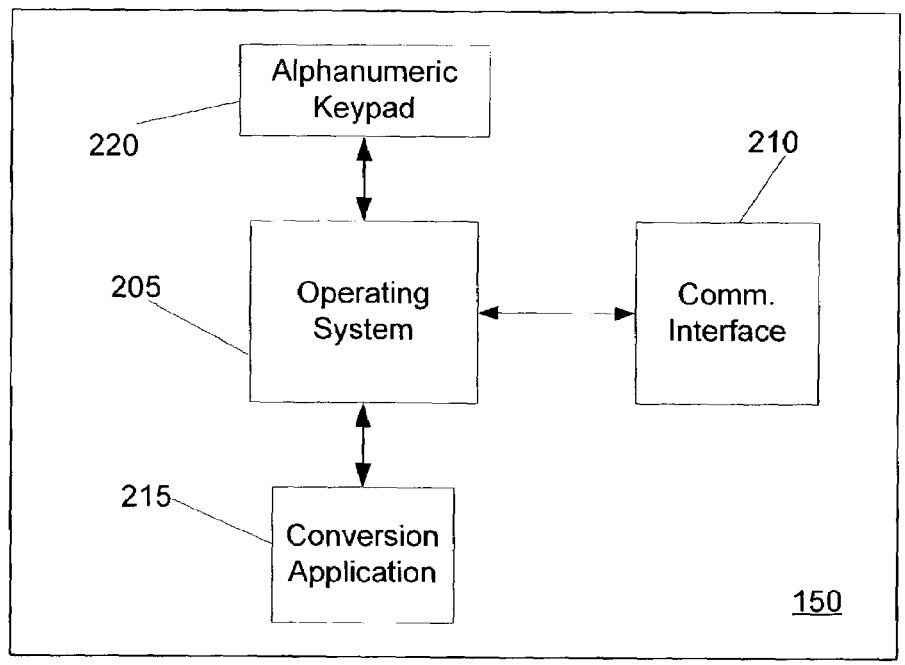
FIG. 2 illustrates a block diagram of a mobile platform embodying a text to number conversion according to principles of the present invention.

FIG. 2 illustrates a block diagram of a mobile platform 150 embodying a text to number conversion according to principles of the present invention. The mobile platform 150 comprises a communication interface 210 for providing RF communication between the communication tower 145 and the processor with operating system 205. The operating system controls the operation of the mobile platform, and as it relates to the present invention, accepts user input from the alphanumeric input device 220. As previously mentioned, the alphanumeric input device 220 may comprise, for example, a soft alphanumeric keypad (one implemented in software), a hardware alphanumeric keypad, or a stroke based entry system. The alphanumeric input device may be remote from the mobile platform and interface via a wired or wireless technology, such as IrDA or Bluetooth.

The operating system 205 receives the input from the alphanumeric device and provides it to conversion application 215. Conversion application 215 converts the alphanumeric string to a numeric string based on a set of rules to be discussed in a later portion of the present description. Once converted, the numeric string is returned to the operating system 205 for use in dialing a called party. In some embodiments of the present invention, the conversion may occur after the string has been completely entered, while in other embodiments conversion may occur as the string is entered, i.e, on the fly conversion. In alternative embodiments of the invention, the converted characters may be displayed on a screen for the user to view.

In certain embodiments of the present invention, the mobile device may not contain a conversion application, and conversion may be performed remotely.

Figure 3:
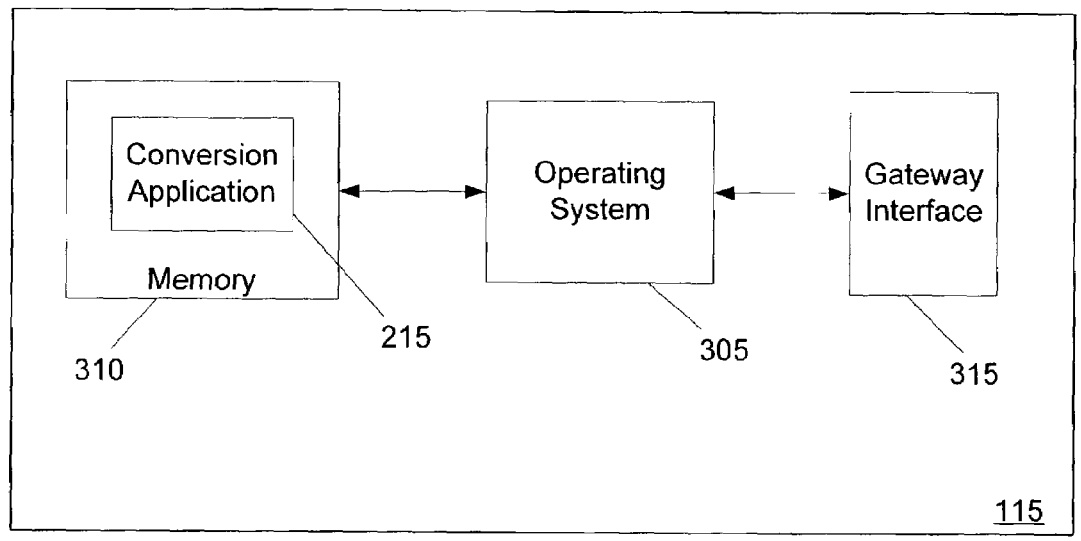
FIG. 3 illustrates a block diagram of a messaging server embodying a text to number conversion according to principles of the present invention.

FIG. 3 illustrates a block diagram of a Messaging Server embodying a text to number conversion according to principles of the present invention. In the Messaging Server 115 of an embodiment of the present invention, the Messaging Server 115 receives an alphanumeric string and returns a numeric string based on the conversion rules. Gateway interface 315 receives the SMS or Mobitex message containing the alphanumeric string along with a request to convert the alphanumeric string to a numeric string. The gateway interface 315 passes this input string via the processor with operating system 305 to the conversion application 215 residing in memory 310. The conversion application 215 converts the input alphanumeric string to a numeric string and returns this output string to the gateway interface 315 for eventual transmission to the mobile platform.

Figure 4:
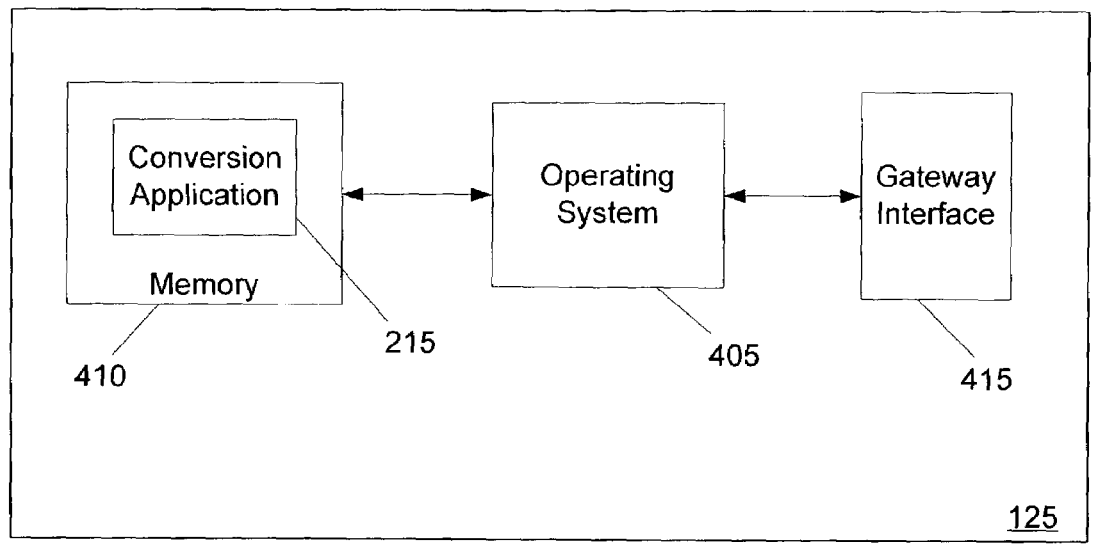
FIG. 4 illustrates a block diagram of a WAP server embodying a text to number conversion according to principles of the present invention.

FIG. 4 illustrates a block diagram of a WAP server embodying a text to number conversion according to principles of the present invention. In the WAP Application server 125 of an embodiment of the present invention, the server 125 receives an alphanumeric string and returns a numeric string based on the conversion rules. Gateway interface 415 receives the WAP message containing the alphanumeric string along with a request to convert the alphanumeric string to a numeric string. The gateway interface 415 passes this input string via the processor with operating system 405 to the conversion application 215 residing in memory 410. The conversion application 215 converts the input alphanumeric string to a numeric string and returns this output string to the gateway interface 415 for eventual transmission to the mobile platform.

Figure 5:
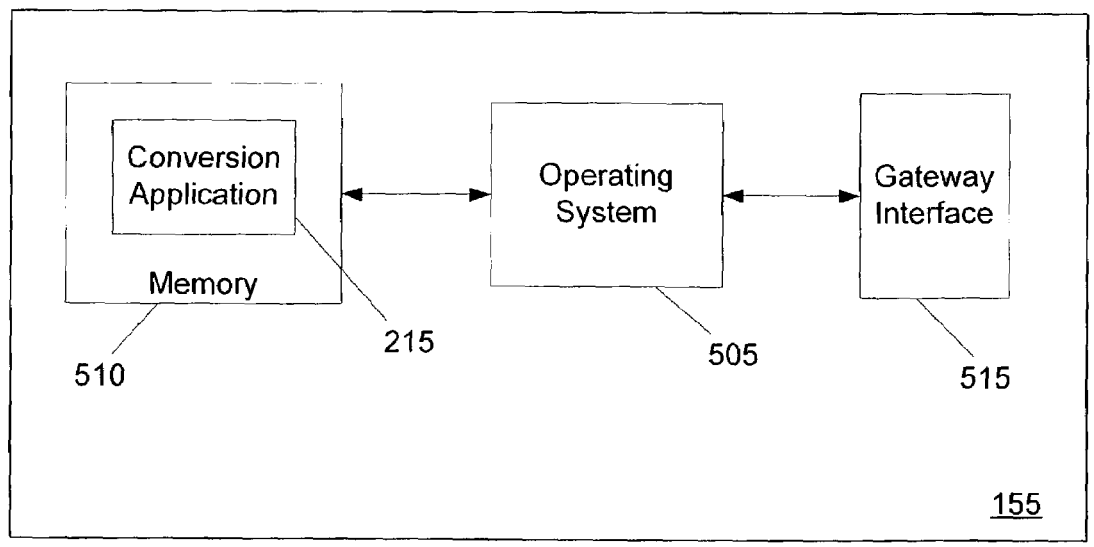
FIG. 5 illustrates a block diagram of an Internet server embodying a text to number conversion according to principles of the present invention.

FIG. 5 illustrates a block diagram of an Internet server embodying a text to number conversion according to principles of the present invention. FIG. 5 illustrates a block diagram of a Internet server embodying a text to number conversion according to principles of the present invention. In the Internet Application server 155 of an embodiment of the present invention, the server 155 receives an alphanumeric string and returns a numeric string based on the conversion rules. Gateway interface 515 receives the HTML message containing the alphanumeric string along with a request to convert the alphanumeric string to a numeric string. The gateway interface 515 passes this input string via the processor with operating system 505 to the conversion application 215 residing in memory 510. The conversion application 215 converts the input alphanumeric string to a numeric string and returns this output string to the gateway interface 515 for eventual transmission to the mobile platform.

Figure 6:
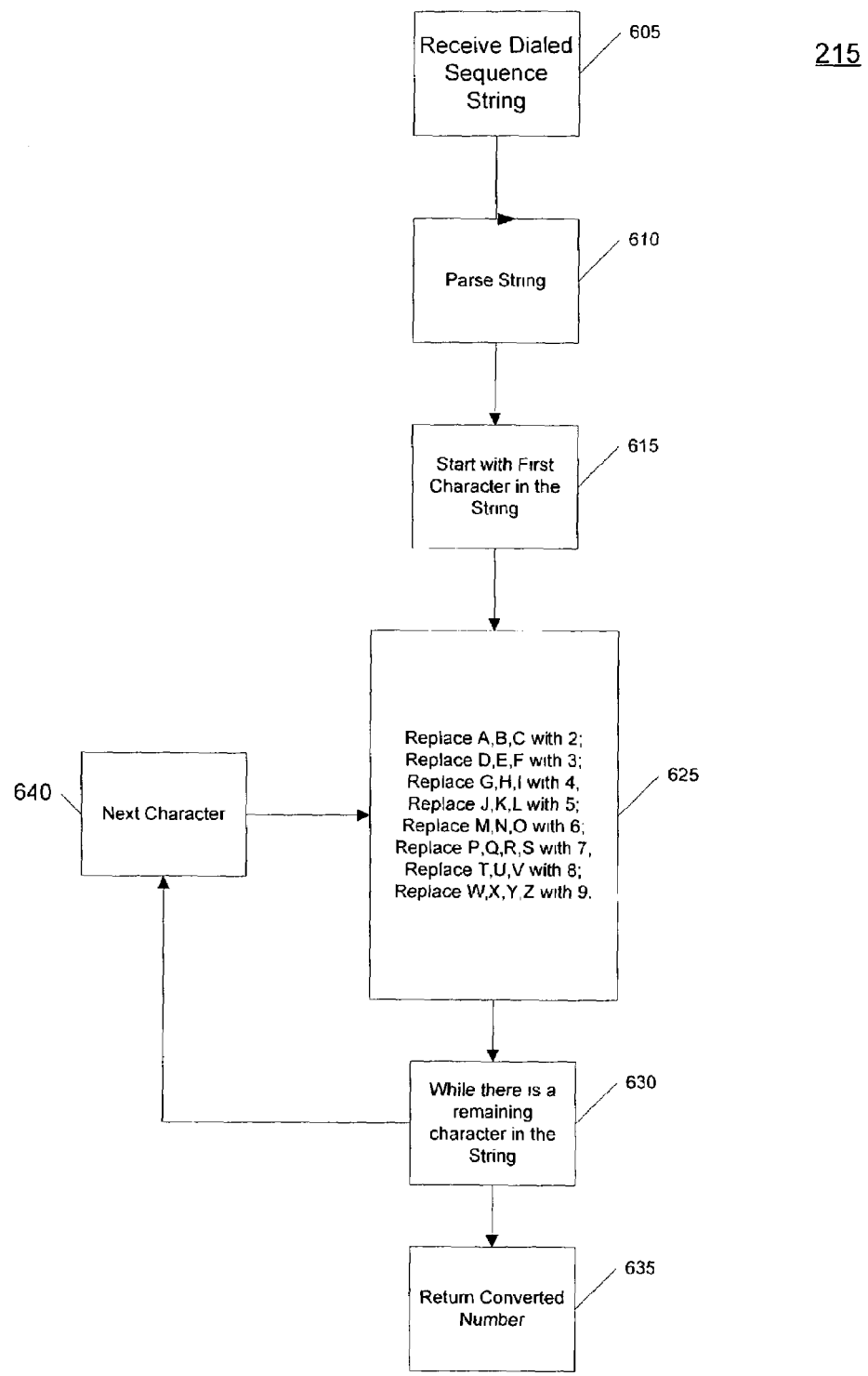
FIG. 6 illustrates a flowchart of an exemplary text to number conversion routine in accordance with the principles of the present invention.

FIG. 6 illustrates a flowchart of an exemplary text to number conversion routine 215 in accordance with the principles of the present invention. This is merely an exemplary routing and those skilled in the art will appreciate that there are a vast number of parsing routines to accomplish the same result. At stage 605, the conversion routine 215 receives the alphanumeric dialed number sequence as an input alphanumeric string. At stage 610, parsing of the input string begins. At stage 615, the character in the first position in the string is selected. At stage 625, the character at the selected position is replaced with its numeric equivalent, according to the following table:

| Character | Numeric Equivalent |
| --- | --- |
| A, B, C | 2 |
| D, E, F | 3 |
| G, H, I | 4 |
| J, K, L | 5 |
| M, N, O | 6 |
| P, Q, R, S | 7 |
| T, U, V | 8 |
| W, X, Y, Z | 9 |

At stage 630, a check is made to see if anymore characters remain in the string. While there are characters in the string, at stage 640 the next character position is selected and flow continues to stage 625. When the end of the string is reached, at stage 635 the converted numeric string is returned.

Figure 7:
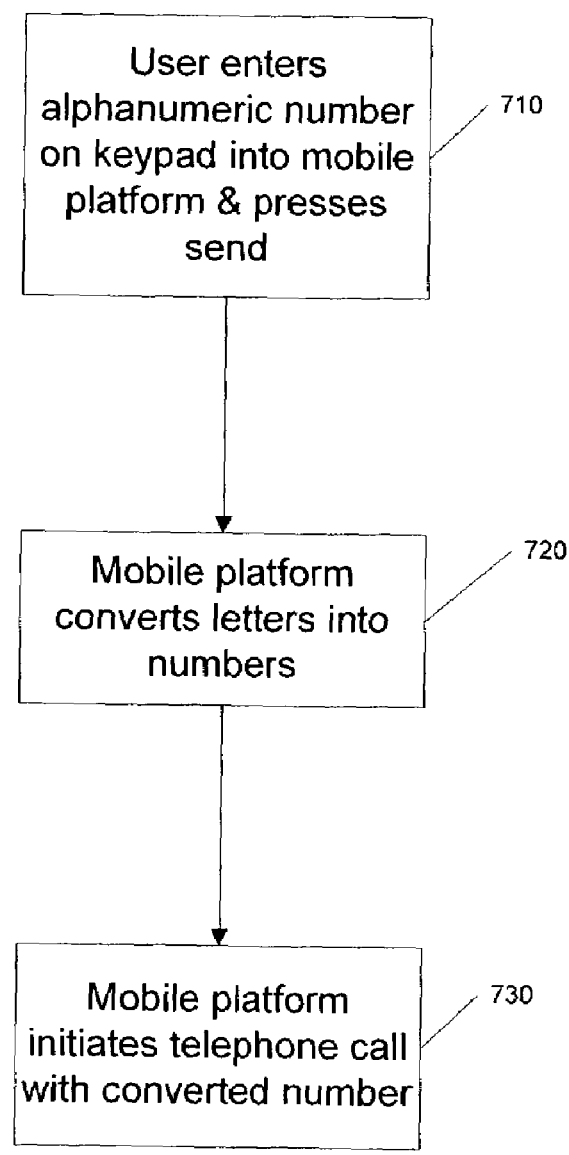
FIG. 7 illustrates a flowchart of an exemplary text to number conversion system embodied in a mobile platform in accordance with the principles of the present invention.

FIG. 7 illustrates a flowchart of an exemplary text to number conversion system embodied in a mobile platform in accordance with the principles of the present invention. At stage 710, a user enters an alphanumeric number into the keypad of the mobile platform and initiates the send key. In an alternative method, the user may select an alphanumeric string stored within the device and select the send key. This would be if the number was stored in some form of internal directory on the mobile platform. At stage 720, the operating system initiates a conversion routing, such a conversion routine 215, to convert the alphanumeric string into a numeric string. At stage 730, the numeric string is returned and the mobile platform initiates the call using the numeric string.

Embodiments of the present invention may be utilized where the mobile platform does not locally convert the alphanumeric string into a numeric string prior to dialing, such alternative systems are illustrated in FIGS. 8, 9, 10, and 11. Note that in the following alternative embodiments, no special conversion software need be installed in the mobile platform.

Figure 8:
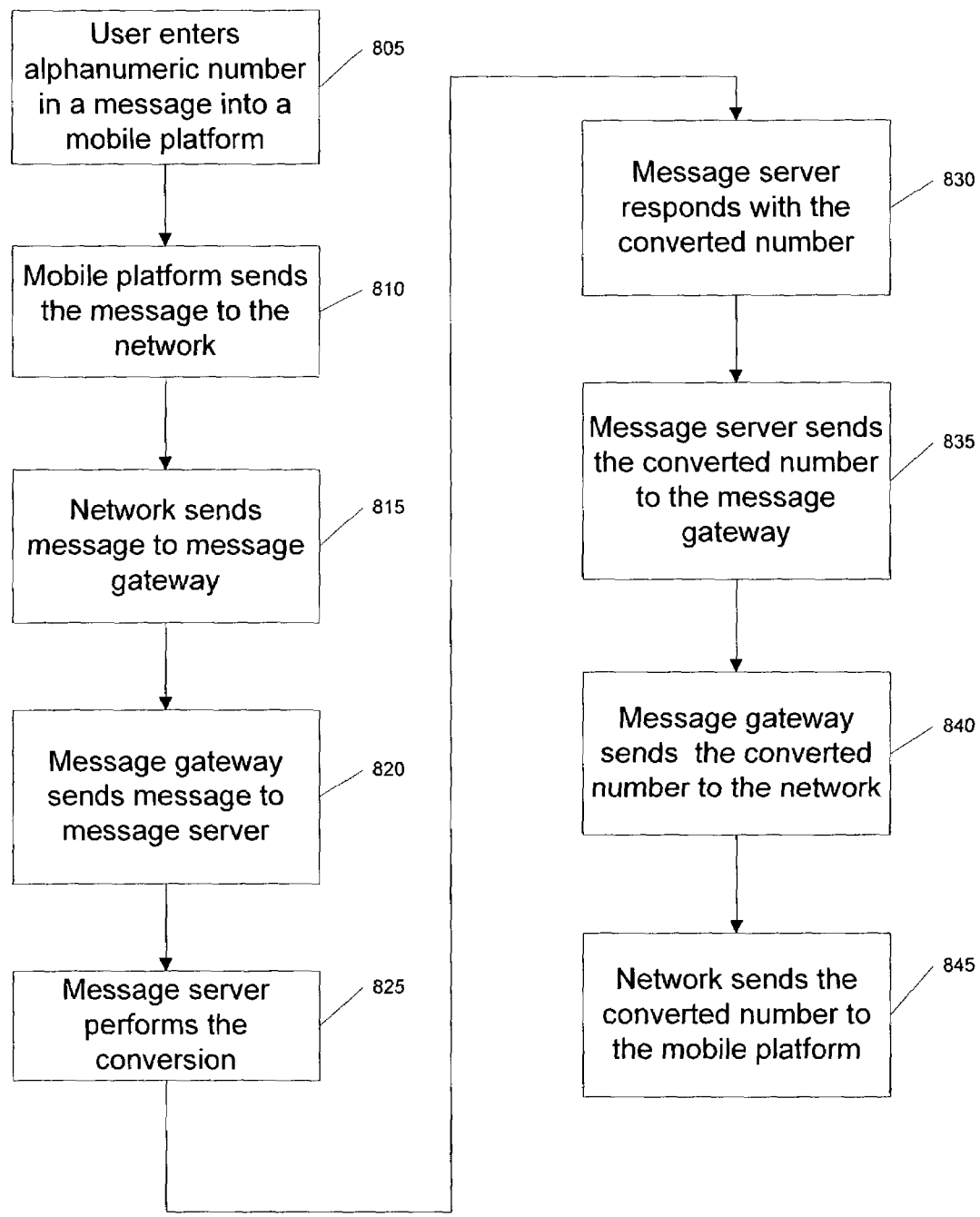
FIG. 8 illustrates a flowchart of an exemplary text to number conversion system embodied in a message server in accordance with the principles of the present invention.

FIG. 8 illustrates a flowchart of an exemplary text to number conversion system embodied in a message server in accordance with the principles of the present invention. At stage 805, a user enters an alphanumeric dial string into the mobile platform. At stage 810, the mobile platforms places the alphanumeric string into an SMS or Mobitex message and send that message to the switching platform. At stage 815, the switching platform sends the message to the message gateway. At stage 820, the message gateway sends the message to the message server. At stage 825, the message server runs a conversion routing, such as conversion routine 215, to convert the alphanumeric string into a numeric string.

At stage 830, the message server returns the numeric string which is sent to the message gateway at stage 835. At stage 835, the message gateway sends the converted string, in an SMS or Mobitex message, to the switching platform. At stage 845, the switching platform sends the converted string to the mobile platform. The mobile platform then initiates a dial routine using the numeric string to dial the called party. In an alternative embodiment, the switching platform captures the returned numeric string in the SMS message and initiates the call without the need to return the numeric string to the mobile platform.

Figure 9:
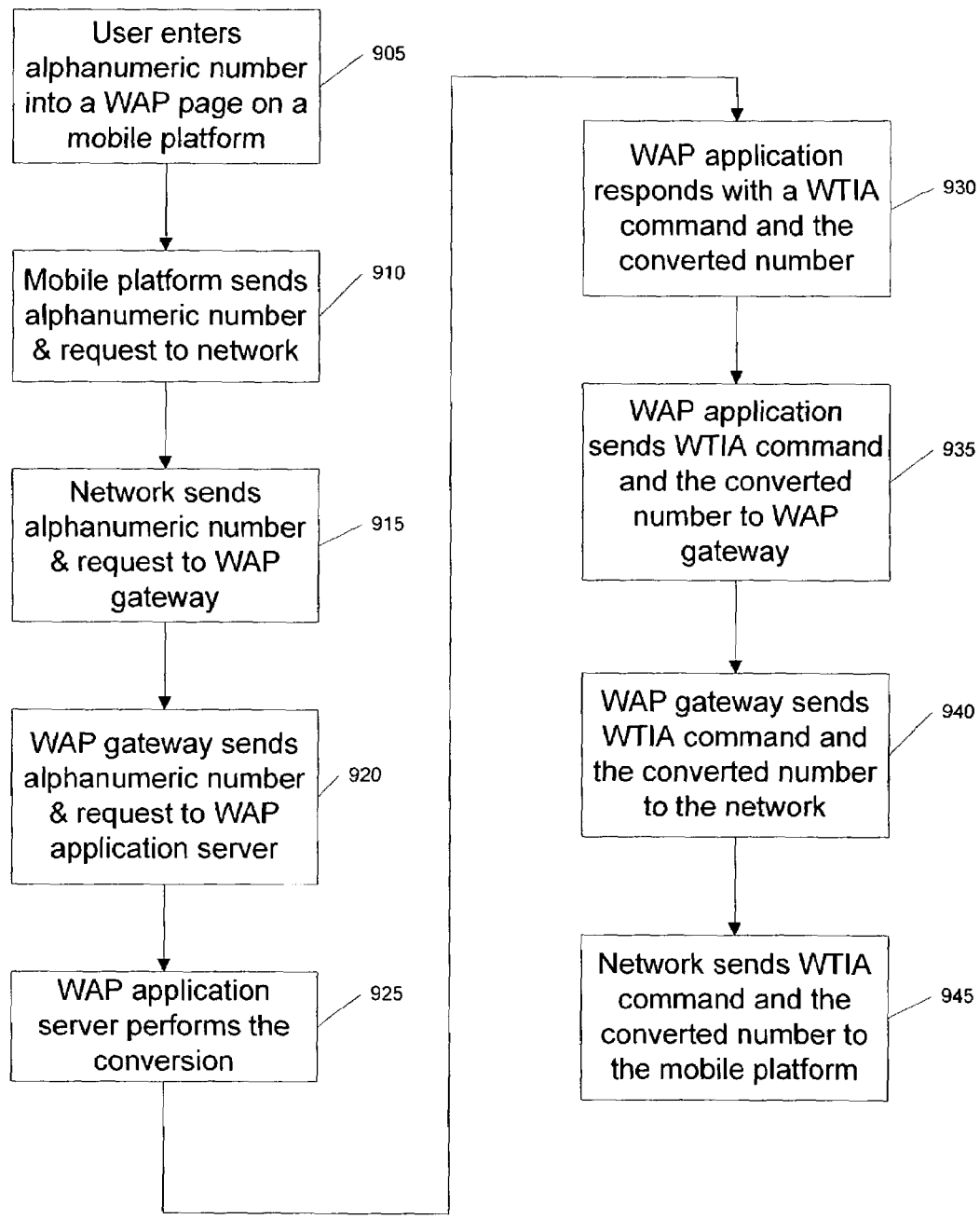
FIG. 9 illustrates a flowchart of an exemplary text to number conversion system embodied in a WAP server in accordance with the principles of the present invention.

FIG. 9 illustrates a flowchart of an exemplary text to number conversion system embodied in a WAP application server in accordance with the principles of the present invention. At stage 905, a user enters an alphanumeric dial string into the mobile platform on a WAP WML (Wireless Markup Language) page. At stage 910, the mobile platforms sends the alphanumeric string and a conversion request to the switching platform. At stage 915, the switching platform sends the sends the alphanumeric string and a conversion request to the WAP gateway. At stage 920, the WAP gateway sends the string and request to the WAP application server. At stage 925, the WAP application server runs a conversion routing, such as conversion routine 215, to convert the alphanumeric string into a numeric string.

At stage 930, the WAP application server returns the numeric string associated with a WTAI (Wireless Telephony Application Interface) dial command which is sent to the WAP gateway at stage 935. At stage 935, the WAP gateway sends the WTAI command and numeric string to the switching platform. At stage 945, the switching platform sends the WTAI command and converted string to the mobile platform. The mobile platform then initiates a dial routine using the numeric string to dial the called party.

Figure 10:
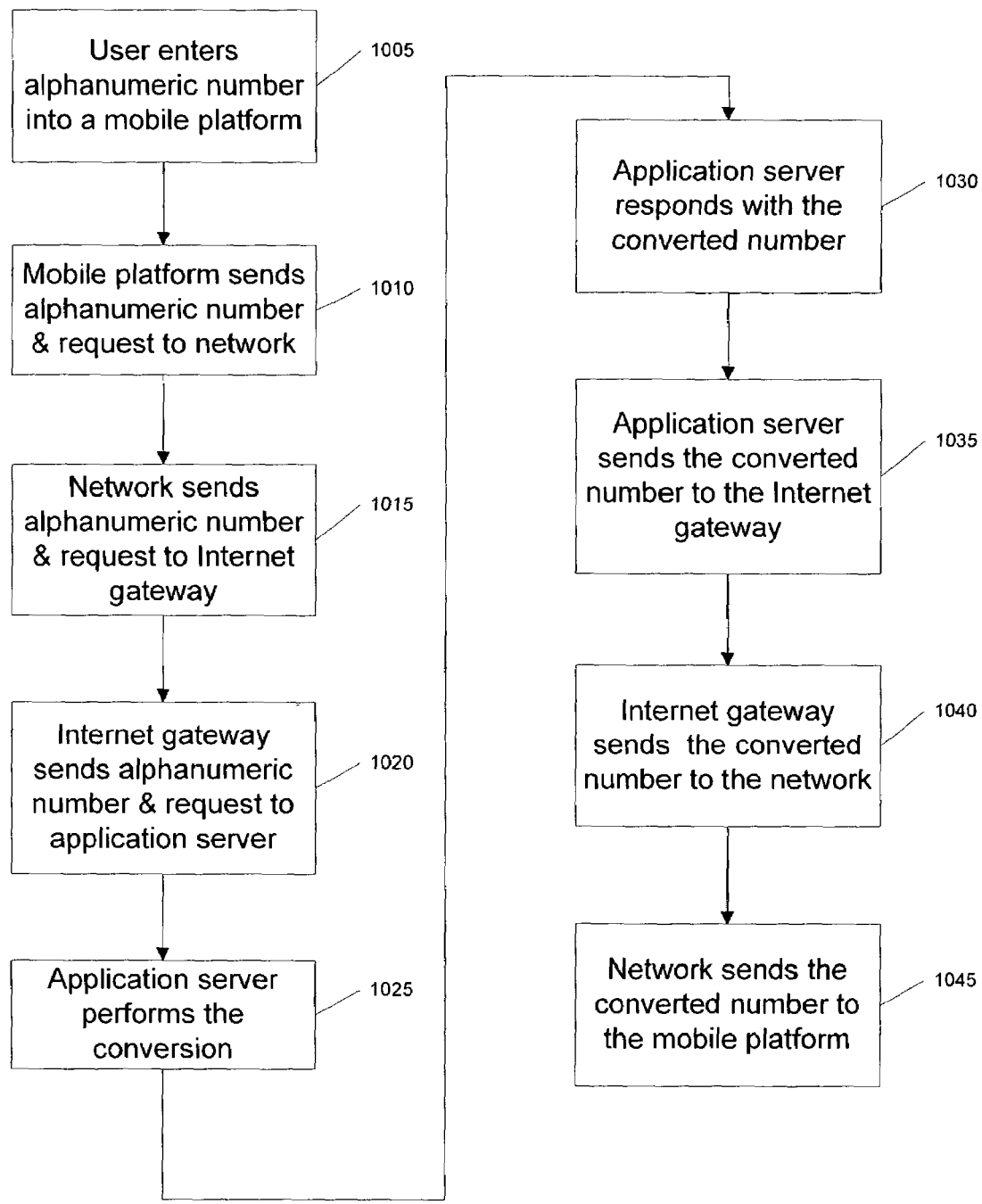
FIG. 10 illustrates a flowchart of an exemplary text to number conversion system embodied in an Internet application server in accordance with the principles of the present invention.

FIG. 10 illustrates a flowchart of an exemplary text to number conversion system embodied in an Internet application server in accordance with the principles of the present invention. At stage 1005, a user enters an alphanumeric dial string into the mobile platform. At stage 1010, the mobile platforms places the alphanumeric string into an SMS or Mobitex message and send that message to the switching platform. At stage 1015, the switching platform sends the message to the Internet gateway. At stage 1020, the Internet gateway sends the message to the Internet application server via the Internet. At stage 1025, the Internet application server runs a conversion routine, such as conversion routine 215, to convert the alphanumeric string into a numeric string.

At stage 1030, the Internet application server returns the numeric string which is sent to the Internet gateway at stage 1035. At stage 1035, the Internet gateway sends the converted string to the switching platform. At stage 1045, the switching platform sends the converted string to the mobile platform. The mobile platform then initiates a dial routine using the numeric string to dial the called party. In an alternative embodiment, the switching platform captures the returned numeric string and initiates the call without the need to return the numeric string to the mobile platform.

Figure 11:
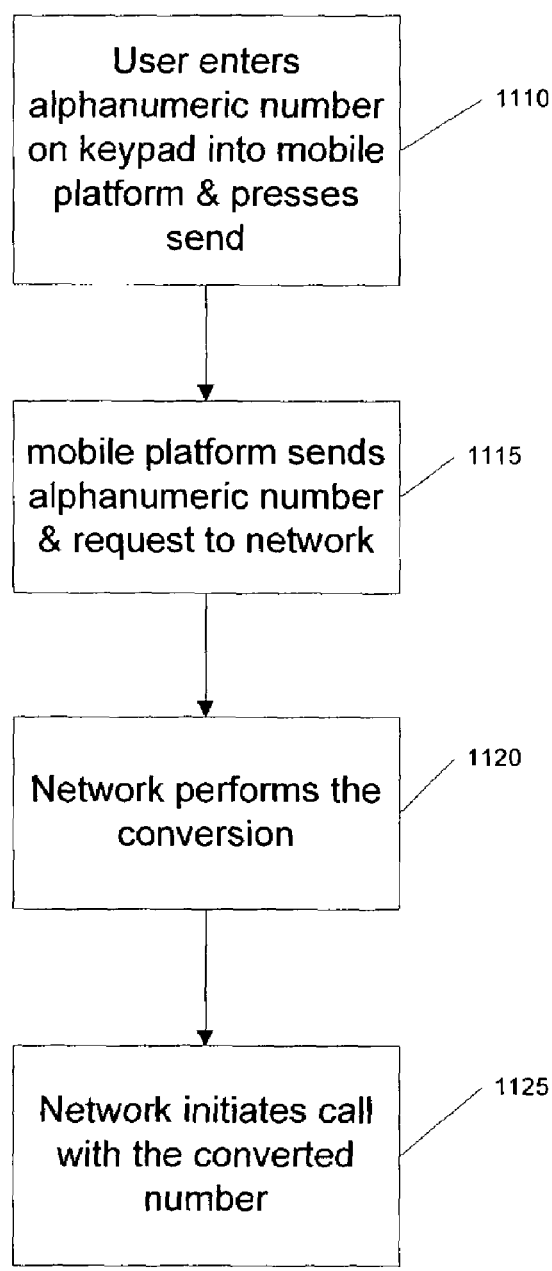
FIG. 11 illustrates a flowchart of an exemplary text to number conversion system embodied in a mobile telephony network in accordance with the principles of the present invention.

FIG. 11 illustrates a flowchart of an exemplary text to number conversion system embodied in a mobile telephony network in accordance with the principles of the present invention. At stage 1110, the user enters an alphanumeric string into the mobile platform. At stage 1115, the mobile platform sends the alphanumeric string to the mobile telephony network. At stage 1120, the mobile telephone network, using a conversion routine such as conversion routine 215, converts the alphanumeric string into a numeric string. At stage 1125, the mobile telephony network initiates the call.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A remote server for use in a mobile communications network to remotely convert an input alphanumeric string into an output numeric string, comprising:
   an input gateway to receive the input alphanumeric string from a mobile device; memory; and
   a processor on said remote server coupled to the input gateway and the memory, the processor operable to:
      receive the input alphanumeric string from the mobile device;
      replace one or more characters within the input alphanumeric string with its numeric equivalent to generate an output numeric string; and
      return the output numeric string.

2. The server of claim 1, wherein the server is an SMS server and the processor is further operable to:
   retrieve the input alphanumeric string from within a received SMS message; and
   return the output numeric string as a return SMS message that includes the output numeric string.

3. The server of claim 1, wherein the server is a Mobitex server and the processor is further operable to:
   retrieve the input alphanumeric string from within a received Mobitex message; and
   return the output numeric string as a return Mobitex message that includes the output numeric string.

4. The server of claim 1, wherein the server is a WAP application server and the processor is further operable to:
   retrieve the input alphanumeric string from within a received WML (Wireless Markup Language) message; and
   return the output numeric string as a returned WML (Wireless Markup Language) message that includes the output numeric string and a WTAI (Wireless Telephony Application Interface) dial command.

5. The server of claim 1, wherein the server is an Internet application server and the processor is further operable to:
   retrieve the input alphanumeric string from within a received HTML message; and
   return the output numeric string as a returned HTML message that includes the output numeric string.

6. The server of claim 1, wherein the server is a mobile telephony switch and the processor is further operable to:
   retrieve the input alphanumeric string from within a received dialed number from a mobile platform; and
   initiate a dialed call using the output numeric string.

7. A method of converting an alphanumeric input string into a numeric input string on a remote server, the method comprising:
   receiving the input alphanumeric string from a mobile device;
   replacing one or more characters within the input alphanumeric string with its numeric equivalent to generate an output numeric string on the remote server; and
   providing the output numeric string to the mobile device.

8. The method of claim 7 wherein providing the output numeric string to the mobile device further comprises encapsulating the output numeric string in an SMS message.

9. The method of claim 7 wherein providing the output numeric string to the mobile device further comprises encapsulating the output numeric string in a Mobitex message.

10. The method of claim 7 wherein providing the output numeric string to the mobile device further comprises encapsulating the output numeric string in a WML (Wireless Markup Language) message along with a WTAI (Wireless Telephony Application Interface) command to dial the output numeric string.

11. The method of claim 7 wherein providing the output numeric string to the mobile device further comprises encapsulating the output numeric string in an HTML message.

12. A method of converting an alphanumeric input string into a numeric input string on a remote server, the method comprising:
   receiving the input alphanumeric string from a mobile device;
   replacing one or more characters within the input alphanumeric string with its numeric equivalent to generate an output numeric string on the remote server; and
   dialing a destination based on the output numeric string.

* * * * *